Figure 1:
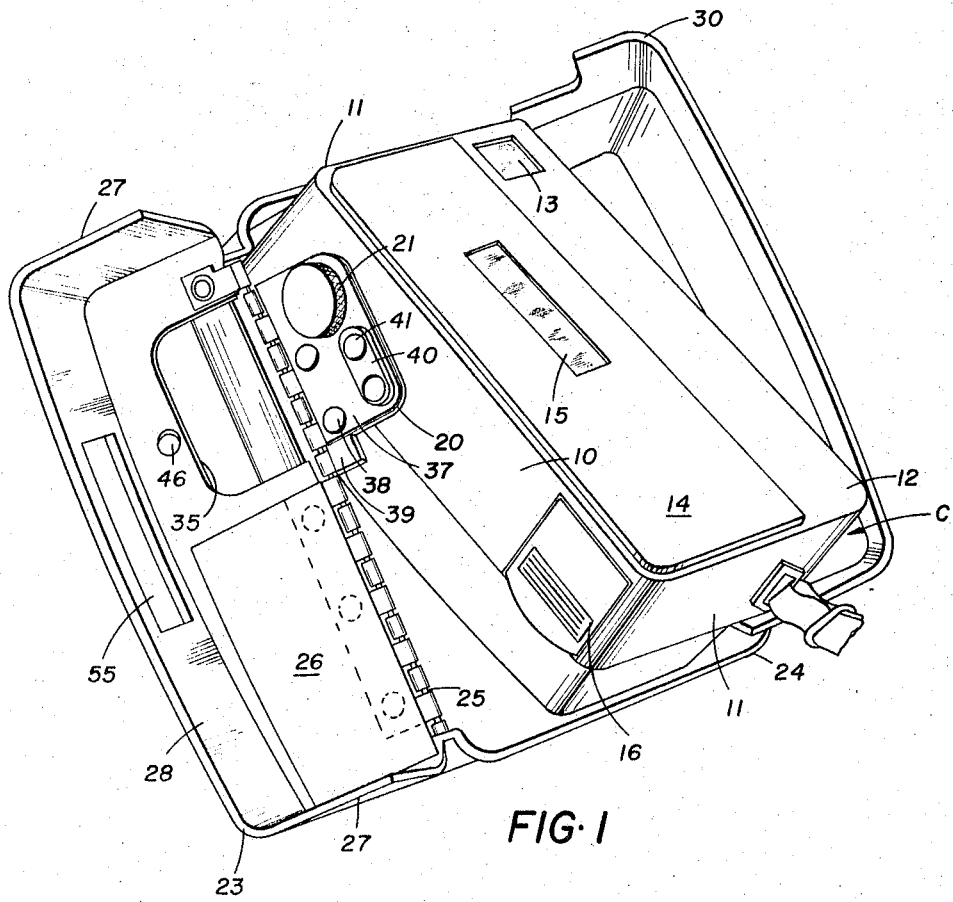

April 18, 1967  V. F. LANG  3,314,348
CAMERA CARRYING CASE
Filed Sept. 11, 1964

VINCENT F. LANG
INVENTOR.

BY R. Frank Smith

ATTORNEYS

United States Patent Office 3,314,348
Patented Apr. 18, 1967

3,314,348
CAMERA CARRYING CASE
Vincent F. Lang, Rochester, N.Y., assignor to Eastman Kodak Company, Rochester, N.Y., a corporation of New Jersey
Filed Sept. 11, 1964, Ser. No. 395,694
4 Claims. (Cl. 95—11)

The present invention relates to a carrying case for a photographic camera, and particularly to a case for the new Kodak Instamatic Camera which allows the same to be loaded with film and/or permits the drive motor of the camera, if it has one, to be wound without having to remove the camera from the case.

The new Kodak Instamatic Cameras now on the market are loaded with film by opening a door on the rear thereof and dropping a roll film cartridge into the camera. Also, a certain model of this line of camera, e.g., the Kodak Instamatic 800 Camera, includes a spring motor for automatically advancing the film after each exposure, said spring motor being wound by pulling a tape from the bottom wall of the camera. The carrying cases originally provided for those models of this line of cameras not having a spring motor film transport necessitated the camera being removed from the case in order to load it with film thus defeating the quick and easy film-loading feature claimed for these cameras, see my co-pending U.S. design applications Des. 77,622 and 77,623 filed Nov. 29, 1963, now Design Patents Des. 200,990 and Des. 200,991 respectively. Likewise, the carrying case for the motor-driven model of this camera, known as the Kodak Instamatic 800 Camera, and disclosed in U.S. Design Patent Des. 197,095, necessitated the camera being removed from its carrying case each time its motor was to be wound.

The primary object of the present invention is to provide a carrying case for a camera which detachably connects the camera in the case and at the same time permits ready-loading of the film into the camera without having to remove the camera from the case.

Another object is to provide a carrying case for the camera of the type described having a spring-driven film transport which is wound by manual manipulation of a member accessible from the bottom wall of the camera, said case being designed to permit the spring motor to be wound without having to remove the camera from the case.

Still another object of the invention is to provide a camera carrying case of the type described comprising at least two members hinged on a common axis at one edge of a rigid base plate to individually move between an operative position in which they combine to enclose the camera and inoperative, or open, position wherein one member uncovers the camera front to permit the use of the camera and the second member uncovers the back and the bottom of the camera to permit film loading and winding of the spring motor drive if the camera is equipped with one. One of the two members is releasably locked in its operative position because it remains in this position at all times except when the camera is to be loaded or is to be wound if it is provided with a spring driven film transport mechanism.

Figure 2:
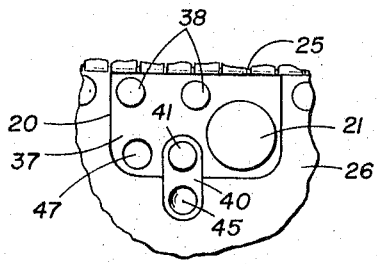

The novel features that I consider characteristic of my invention are set forth with particularity in the appended claims. The invention itself, however, both as to its organization and its methods of operation, together with additional objects and advantages thereof, will best be understood from the following description of specific embodiments when read in connection with accompanying drawings in which:

FIG. 1 is a perspective view showing a camera mounted in a carrying case of my new design, said case being open to permit loading of the camera with film and the winding of the spring motor of the film transport mechanism of the camera, and FIG. 2 is a partial plan view of the bottom of the carrying case showing the rear hinged member latched in its operative position.

The camera C which the present carying case is adapted to accommodate is one of the type known in the trade as the Kodak Instamatic Camera and which has a rigid bottom wall 10, a pair of substantially parallel end walls 11, a top portion 12 including a finder 13 and a rear door 14 which is hinged at one end to be movable to and from an open position to permit loading of the camera with a film cartridge, as is well known. The rear door 14 is provdided with an elongated window 15 through which a label on the film cartridge can be seen to identify the type of film in the camera and to observe the number of the exposure on the film which is in exposure position. This camera is shown as one of the type having a spring driven film transport mechanism which is wound by grasping a grip 16 normally located flush in a recess in the bottom wall of the camera and which when pulled away from the bottom wall winds the spring motor by means of a tape, see pending U.S. patent application, Ser. No. 260,628, D. E. Beach, filed Feb. 25, 1963, now Patent No. 3,186,322, for a complete description thereof.

The primary object of the present invention is to provide a carrying case for this type of camera which allows the camera to be detachably connected within the case so that the two can be handled as a single unit, but at the same time permit the camera to be readily loaded with film, and to have its spring motor transport tensioned, without having to detach and remove the camera from the case.

To this end, the case comprises a rigid base plate 20, preferably made of metal, through a hole in which a tripod screw having a threaded end, not shown, and a knurled head 21 extends and is rotatably mounted. The threaded end of the tripod screw is adapted to engage a conventional threaded socket, not shown, in the bottom wall of the camera to draw the bottom wall of the camera against the inside surface of the base plate to detachably secure the camera in the case in a manner shown in FIG. 1. The case includes a first case member 23 and a second case member 24, both of which, along with the base plate 20, are hinged on a common hinge pintle 25 running parallel to and adjacent the forward edge of the base plate. The first member 23, which is preferably formed of a plastic material, has a bottom wall 26 and side and back walls 27 and 28, respectively, which when the member is swung up to its operative position from its inoperative position shown, covers the bottom wall and parts of the side walls and back wall of the camera. The back wall 28 of member 23 includes an aperture 55 through which the window 15 in the rear door of the camera may be seen when the member is in its operative position.

The second member 24 is preferably formed of plastic material as shown in U.S. Patent Des. 197,095 and includes a third piece 30 hinged to the open edge thereof so that it and its component part 24 will enclose the front wall, part of the side walls, the top and that portion of the rear wall of the camera not covered by the first member when it is in its operative position, as shown in the above-noted design patent. It will be apparent from an examination of the above-noted patent that when the members 23 and 24 are moved to their closed or operative positions they will completely enclose the camera. Since the shape of the second member 24 and the manner in which it covers and uncovers the front, top, and part of the rear of the camera is fully disclosed in the noted design patent and is not important to the present invention, the details of this member 24 and its associated part 30 and how they cooperate with the camera is not being shown herein in any more detail than is necessary to a complete understanding of the present invention.

The bottom wall 26 of the first member 23 is provided with a cut-out 35 of a shape and size corresponding to the shape and size of the base plate 20 so that when the member 23 is swung up to its operative position the base plate 20 will close the cut-out 35, see FIG. 2. So that the outside surface of the base plate 20 will have the same appearance as the outside of first member 23 and will be flush therewith when the member is moved to its operative position, the outside surface of base plate 20 has a piece of plastic material 37 fastened thereto by rivets 38 or by any other suitable means, e.g., adhesive, etc. As will be seen in FIG. 1, the base plate 20 has an extension 39 at one edge thereof which extends beyond the edge of the cut-out 35. This extension will engage the inside of the bottom wall 26 to prevent the base plate 20 from falling through the cut-out 35 when there is no camera attached to the base plate.

The only time the first member 23 needs to be dropped to its inoperative position, shown in FIG. 1, is when the camera is to be loaded with film or the camera motor is to be wound, if the camera is so equipped. To releasably hold the first member 23 in its operative position, a latch member 40 is pivotally staked at one end 41 to the outside surface of the base plate 20 to move between a release position shown in FIG. 1, wherein it lies within the confines of the base plate 20, and an operative position, see FIG. 2, wherein it extends beyond the edge of the cut-out 35 and overhangs the outside surface of the bottom wall 26 of the first member 23. For the purpose of detenting the latched member in each of its two positions, the free end thereof is provided with a dimple 45 which is adapted to snap into a corresponding hole 47 in the base plate 20 or a corresponding hole 47 in the bottom wall 26 of the first member 23.

When used to house cameras of the type illustrated which have a spring motor driven film transport, the attachment between the camera and the base plate 20 permits the free end of the camera to be pivoted away from the hinge so that the grip 16 can be grasped and pulled from the camera to wind the spring motor, as shown in FIG. 1.

While I have shown my present invention as forming a part of a three-piece camera carrying case of the type shown in Design Patent 197,095, it necessarily follows that it would also be adaptable and useful in combination with a two-piece camera carrying case of the type shown in U.S. design application Des. 78,671 filed Feb. 17, 1964, now Patent No. Des. 198,729, and of which I am a co-inventor. In this last-mentioned instance, the base plate 20 of the present invention would serve the function of the U-shaped camera body clamp in the patented design, namely, detachable to hold the camera in the case, and the two case members could be formed so as to hinge on a common pintle and thereby eliminate the need for the cross member of the U-shaped body clamp forming a part of the case enclosure.

While I have shown and disclosed specific embodiments of my invention for purposes of illustration, I am aware that many modifications thereof are possible. My invention, therefore, is not to be limited to the specific embodiments shown and described, but is intended to include all modifications coming within the scope of the appended claims.

I claim:

1. A carrying case for a photographic camera having a bottom wall, a pair of substantially parallel end walls, a top wall and a rear door which is movable to and from an open position to permit loading of the camera with film; and comprising in combination,
    (1) a base plate,
    (2) means for detachably connecting a wall of said camera to said base plate,
    (3) first and second members individually hinged to the same edge of said base plate to selectively move between a closed position, wherein they combine to enclosed a camera attached to said base plate, and an open position, wherein said second member extends downwardly from said base plate to expose the front wall of said camera and said first member extends downwardly from said base plate to expose said rear door to permit it to be opened, and
    (4) cooperating means on said base plate and said first member for releasably latching said first member in its closed position.

2. A carrying case according to claim 1, in which said last mentioned cooperating means includes a surface on said base plate adapted to extend through a cut-out provided in said first member when said first member is moved to its closed position, and a latch member movably mounted on said surface to move between a latching position wherein it overhangs an edge of said cut-out when said first member is in its closed position, and an unlatching position, wherein it is able to pass through said cut-out.

3. A carrying case according to claim 1, in which said base plate is shorter than said wall of said camera connected to said base plate, and said means for detachably connecting said camera to said base plate allows said camera to be pivoted relative to said base plate to permit free access to that portion of the bottom wall which is unsupported by said base plate when said first member is in its open position and said second member is in its closed position.

4. A carrying case according to claim 1, in which said means for detachably connecting said camera to said base plate comprises a threaded thumb screw extending through and rotatably mounted in said base plate, the threaded end of which is adapted to engage a threaded tripod socket in the bottom wall of said camera, said first member provided with a cut-out through which the head of said thumb screw extends for manipulation when said first member is in its closed position.

References Cited by the Examiner
UNITED STATES PATENTS

| | | | |
|---|---|---|---|
| 1,220,957 | 3/1917 | Conway | 95—86 X |
| 1,478,202 | 12/1923 | Cadwell | 95—86 X |
| 2,535,152 | 12/1950 | Nelson | 95—86 |

JOHN M. HORAN, *Primary Examiner.*